United States Patent
Kondo et al.

(10) Patent No.: US 7,046,900 B2
(45) Date of Patent: May 16, 2006

(54) FIBER-WIRED SHEET AND METHOD FOR MANUFACTURING THE SAME

(75) Inventors: Katsuaki Kondo, Tochigi (JP); Kazuo Imamura, Hyogo (JP); Minoru Yoshida, Hyogo (JP); Shogo Ikunishi, Tochigi (JP)

(73) Assignee: Mitsubishi Cable Industries, Ltd., Hyogo (JP)

( * ) Notice: Subject to any disclaimer, the term of this patent is extended or adjusted under 35 U.S.C. 154(b) by 83 days.

(21) Appl. No.: 10/895,102

(22) Filed: Jul. 21, 2004

(65) Prior Publication Data

US 2005/0025931 A1 Feb. 3, 2005

Related U.S. Application Data

(62) Division of application No. 10/188,052, filed on Jul. 3, 2002, now Pat. No. 6,834,132.

(30) Foreign Application Priority Data

Jul. 4, 2001 (JP) .................................... 2001-203302

(51) Int. Cl.
*G02B 6/44* (2006.01)

(52) U.S. Cl. ........................... 385/137; 385/75; 65/406
(58) Field of Classification Search ............ 385/54–55, 385/75, 114, 147, 136–137; 65/385, 406
See application file for complete search history.

(56) References Cited

U.S. PATENT DOCUMENTS

| 4,847,596 | A | | 7/1989 | Jacobson et al. |
| 5,201,015 | A | * | 4/1993 | von Bieren et al. ......... 385/13 |
| 5,649,035 | A | * | 7/1997 | Zimmerman et al. ........ 385/13 |
| 5,796,472 | A | | 8/1998 | Wirthlin |
| 5,878,179 | A | * | 3/1999 | Schricker .................... 385/100 |
| 6,334,020 | B1 | * | 12/2001 | Fujimori et al. ............ 385/134 |
| 6,567,600 | B1 | | 5/2003 | Yoshida |
| 6,632,024 | B1 | | 10/2003 | Kawase et al. |

FOREIGN PATENT DOCUMENTS

| EP | 1 050 765 A1 | 11/2000 |
| JP | 10-068853 | 3/1998 |
| JP | 63-038112 | 3/1998 |
| JP | 11-119034 | 4/1999 |
| JP | 11-211918 | 8/1999 |
| JP | 2000-066034 | 3/2000 |
| JP | 2000-066035 | 3/2000 |
| JP | 2002-365449 | 12/2002 |

* cited by examiner

*Primary Examiner*—Akm Enayet Ullah
*Assistant Examiner*—Jerry T Rahll
(74) *Attorney, Agent, or Firm*—Nixon Peabody LLP; Donald R. Studebaker (57) ABSTRACT

The fiber-wired sheet of the present invention includes a pair of sheets facing each other and a fiber arrangement sandwiched by the pair of sheets. The pair of sheets have respective adhesive layers on the surfaces facing the fiber arrangement. The fiber arrangement has a double-layer structure composed of a continuous fiber, and the layers are in contact with the respective adhesive layers.

8 Claims, 12 Drawing Sheets

FIBER-WIRED SHEET AND METHOD FOR MANUFACTURING THE SAME

BACKGROUND OF THE INVENTION

The present invention relates to a fiber-wired sheet usable for functional optical fiber coils such as optical fiber delay elements and erbium-doped fibers and the like, and a method for manufacturing such a fiber-wired sheet.

Long optical fibers are sometimes used as functional optical fibers such as optical fiber delay elements and erbium-doped fibers. For assembly of an apparatus including a long optical fiber, the optical fiber must be lumped together to be housed in the apparatus. A small bobbin may be used to lump the long optical fiber together. However, using a small bobbin not only makes the entire voluminous but also tends to generate microbending at intersections between the optical fibers and, as a result, may possibly increase the loss.

EPO Publication No. EP1050765A1 discloses an optical fiber holding structure as follows. An optical fiber is arranged in a wound shape with turns displaced from one another in the plane to avoid intersection between portions of the optical fiber. A plurality of turns of the optical fiber are placed in layers at the same position in the thickness direction vertical to the plane in which the optical fiber is arranged. The optical fiber in this state is integrally retained as a sheet with a fixing material such as an adhesive and a film.

The optical fiber holding structure described above being a sheet-like shape as a whole is thin, can be handled integrally without a trouble of coming loose, and can be easily placed in an apparatus. In addition, since the optical fiber is arranged in a wound shape so that no intersection occurs between portions of the optical fiber, the optical fiber can be retained stably without causing microbending and the like.

However, the conventional optical fiber holding structure described above has disadvantages in the aspect of manufacturing efficiency. The optical fiber holding structure is manufactured in the following manner using a manufacturing tool. In the manufacturing tool, two cylindrical winding members for winding an optical fiber are positioned apart from each other by a predetermined distance. A pair of ellipsoidal alignment side plate members are positioned to vertically sandwich the two cylindrical winding members therebetween. One of the alignment side plate members and the two cylindrical winding members are formed integrally. The other alignment side plate member is attached to the cylindrical winding members with bolts or the like. The optical fiber is wound sequentially over the two cylindrical winding members. Upon completion of the winding, the space between the alignment side plate members is filled with a fixing material. The fixing material is hardened to seal the optical fiber with the fixing material as a sheet. The bolts of the manufacturing tool are loosened to detach the alignment side plate member from the optical fiber, and then the optical fiber made integral with the fixing material is released from the manufacturing tool.

As described above, the disclosed optical fiber holding structure requires a complicate manufacturing process. Improvement in manufacturing efficiency is therefore requested.

SUMMARY OF THE INVENTION

An object of the present invention is providing a fiber-wired sheet that can be easily manufactured. This object can be attained by the fiber-wired sheet in the first and second aspects and the method for manufacturing a fiber-wired sheet described as follows.

The fiber-wired sheet in the first aspect of the present invention is a fiber-wired sheet including a pair of sheets facing each other and a fiber arrangement sandwiched by the pair of sheets, wherein the pair of sheets have respective adhesive layers on the surfaces facing the fiber arrangement, and the fiber arrangement has a double-layer structure composed of a continuous fiber, and the layers of the structure are in contact with the respective adhesive layers.

Preferably, the fiber arrangement described above has two fiber-arrangement layers and a continuation portion for enabling continuation between the two fiber-arrangement layers, and the continuation portion is formed outside the two fiber-arrangement layers.

Preferably, the fiber arrangement has two fiber-arrangement layers and a continuation portion for enabling continuation between the two fiber-arrangement layers, and substantially no twist is generated on the continuation portion. The state that "substantially no twist is generated" used herein includes not only the case that no twist is generated at all, but also the case that a twist is generated to a degree of causing no deterioration in polarizing characteristics. For example, a half-turn twist of the fiber will not deteriorate the polarizing characteristics, and thus this is regarded as the state that substantially no twist is generated. In addition, this level of twist will not cause a problem such as breakage.

The layers of the fiber arrangement preferably have roughly the same arrangement pattern. This prevents occurrence of buckling of the fiber.

Preferably, the fiber-wired sheet further includes a single-layer fiber arrangement placed on the outer surface of at least one of the pair of sheets, wherein the single-layer fiber arrangement is composed of a fiber continuing with the fiber arrangement having the double-layer structure and is covered with another sheet having an adhesive layer on the surface facing the single-layer fiber arrangement.

Preferably, the single-layer fiber arrangement continues with the fiber arrangement having the double-layer structure via another continuation portion, and substantially no twist is generated on the another continuation portion.

Preferably, the fiber arrangement having the double-layer structure and the single-layer fiber arrangement have roughly the same pattern.

The fiber-wired sheet in the second aspect of the present invention is a fiber-wired sheet including a fiber arrangement having a multilayer structure composed of a continuous fiber and a sheet interposed between adjacent layers of the fiber arrangement, the sheet having an adhesive layer.

Preferably, the fiber arrangement has a plurality of fiber-arrangement layers and at least one continuation portion for enabling continuation between the plurality of fiber-arrangement layers, and the at least one continuation portion is formed outside the plurality of fiber-arrangement layers.

Preferably, the fiber arrangement has a plurality of fiber-arrangement layers and at least one continuation portion for enabling continuation between the plurality of fiber-arrangement layers, and substantially no twist is generated on the at least one continuation portion.

The layers of the fiber arrangement preferably have roughly the same arrangement pattern.

The fiber arrangement is preferably sandwiched by a pair of sheets having respective adhesive layers on the surfaces facing the fiber arrangement.

The method for manufacturing a fiber-wired sheet of the present invention includes the steps of: arranging a fiber continuously on a plurality of sheets having respective adhesive layers, to form single-layer fiber-arrangement layers on the plurality of sheets; and putting two adjacent sheets among the plurality of sheets one upon the other after the arrangement of the fiber.

The step of putting two adjacent sheets may include the step of reversing one of the two sheets with respect to a virtual axis between the two sheets.

The step of putting two adjacent sheets may include the step of rotating one of the two sheets a half turn as is viewed from top.

In the method for manufacturing a fiber-wired sheet of the present invention, a fiber-wired sheet can be manufactured with substantially no twist generated on the continuation portion for enabling continuation of the fiber-arrangement layers of the fiber arrangement. Specifically, substantially no twist will be generated on the continuation portion by a manufacturing method adopting either of the following four patterns.

(1) A half-turn twist is applied during arrangement of the continuation portion, and a half-turn twist in the direction opposite to that of the twist during the arrangement of the continuation portion is applied when the sheets are put one upon the other.

(2) No twist is applied during arrangement of the continuation portion, and a half-turn twist is applied when the sheets are put one upon the other.

(3) No twist is applied during arrangement of the continuation portion, and no twist is applied when the sheets are put one upon the other, either.

(4) A half-turn twist is applied during arrangement of the continuation portion, and no twist is applied when the sheets are put one upon the other.

The way of applying a twist to the continuation portion and the way of applying no twist to the continuation portion will be described in detail in the embodiments to follow.

DESCRIPTION OF THE PREFERRED EMBODIMENTS

Hereinafter, preferred embodiments of the present invention will be described with reference to the accompanying drawings. In the following embodiments, an erbium-doped fiber sheet (hereinafter, referred to as an EDF sheet) is manufactured as the fiber-wired sheet. Note however that the fiber-wired sheet of the present invention may also be a sheet including arrangement of an optical fiber other than the EDF. The present invention is therefore applicable to manufacture of not only EDF sheets but also any fiber-wired sheets.

Embodiment 1

Figure 1A:
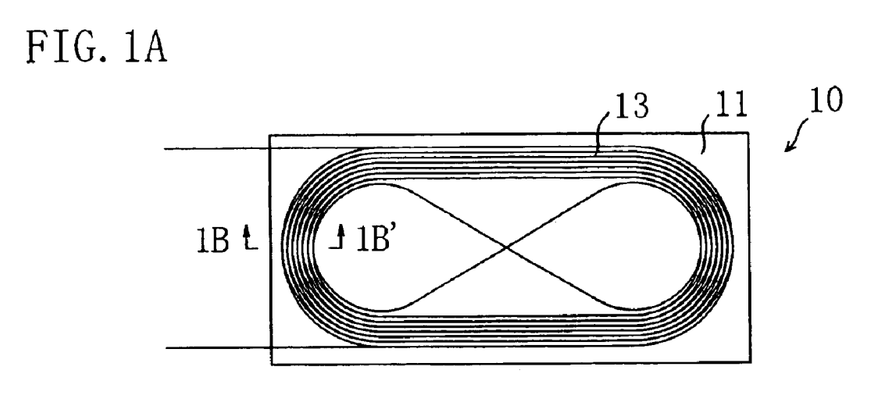
FIG. 1A is a diagrammatic plan view of a fiber-wired sheet of Embodiment 1 of the present invention.
Figure 1B:
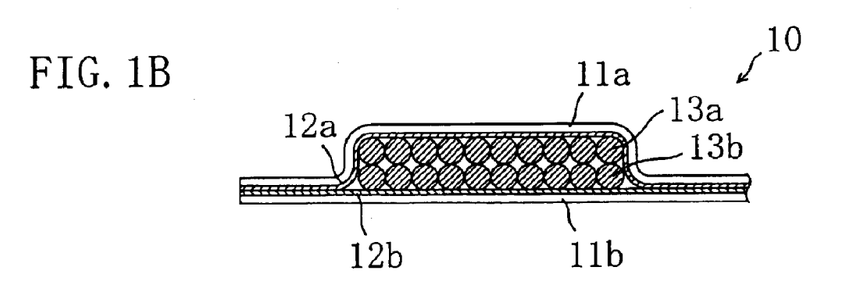
FIG. 1B is a cross-sectional view taken along line 1B–1B' of FIG. 1A.

FIG. 1A is a diagrammatic plan view of a fiber-wired sheet of Embodiment 1, and FIG. 1B is a cross-sectional view taken along line 1B–1B' of FIG. 1A. An EDF sheet 10 of this embodiment is incorporated in an optical amplifier, for example, to serve as an amplifying medium.

The EDF sheet 10 includes a pair of resin sheets 11a and 11b with respective adhesive layers 12a and 12b formed thereon and a fiber arrangement 13 sandwiched by the pair of resin sheets 11a and 11b. The fiber arrangement 13 has a double-layer structure composed of a continuous fiber and is roughly in a shape of oval tracks as is viewed from top. The fiber arrangement 13 is essentially composed of two layered fiber-arrangement layers 13a and 13b and a continuation portion for enabling continuation of the two fiber-arrangement layers 13a and 13b. In this embodiment, the fiber-arrangement layers 13a and 13b are in contact with each other, and the adhesive layers 12a and 12b of the sheets 11a and 11b adhere to the fiber-arrangement layers 13a and 13b, respectively.

Figure 2:
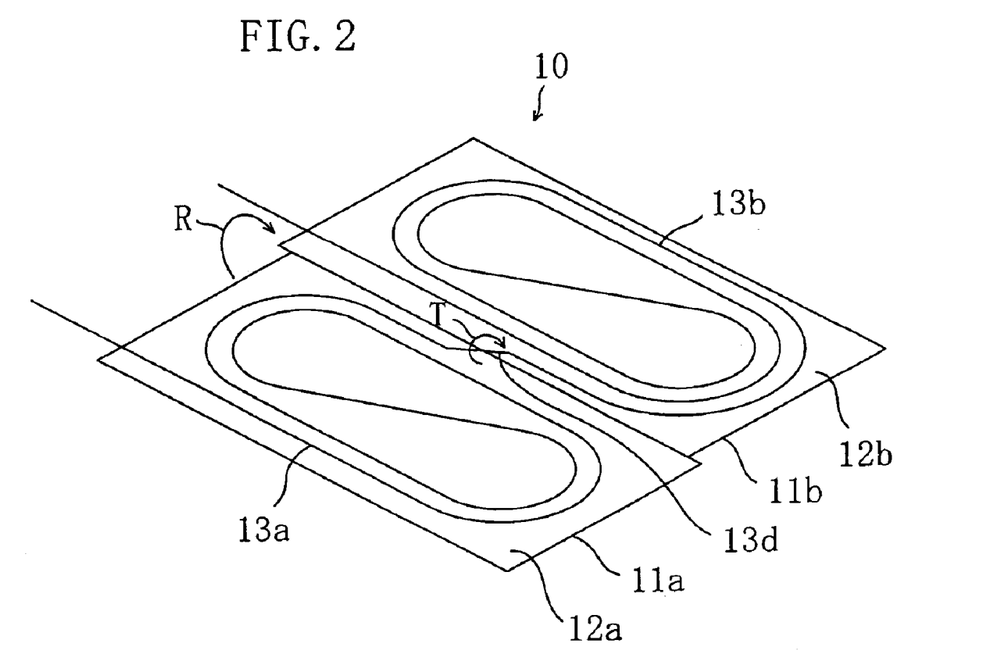
FIG. 2 is a perspective view diagrammatically illustrating a manufacturing process of an EDF sheet 10 of Embodiment 1.

FIG. 2 is a perspective view diagrammatically illustrating a manufacturing process of the EDF sheet 10 of Embodiment 1. Referring to FIG. 2, the manufacturing process in this embodiment will be described. First, prepared are the resin sheets 11a and 11b with the respective adhesive layers 12a and 12b formed thereon. As the resin sheets 11a and 11b, sheets containing polymethyl methacrylate, polystyrene, polyethylene terephthalate, polyimide and the like may be used. The adhesive layers 12a and 12b may be formed of an adhesive material containing a silicone resin, urethane rubber, a UV-curable resin, an epoxy resin, a polyester resin, a polypropylene resin, a polyethylene resin and the like.

Figure 3:
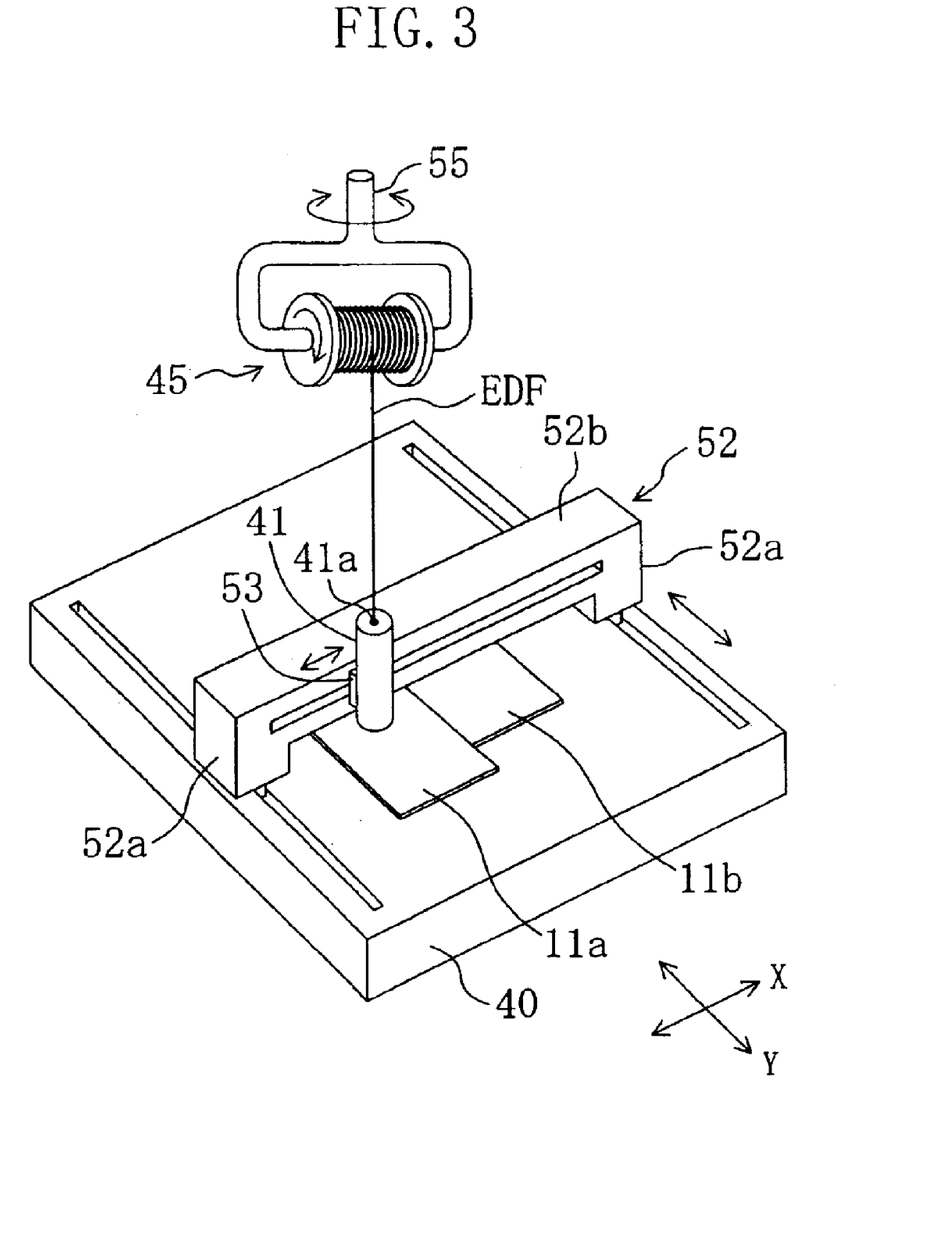
FIG. 3 is a diagrammatic perspective view of a fiber arranging apparatus.

One EDF is arranged over the adhesive layers 12a and 12b like drawing a line continuously. A fiber arranging apparatus capable of controlling the length of the EDF to be arranged is used for the arrangement of the EDF. Preferably, the fiber arranging apparatus is provided with a mechanism for preventing the EDF from being twisted during the arrangement. FIG. 3 is a diagrammatic perspective view of an example of such a fiber arranging apparatus. Referring to FIG. 3, a method of arrangement of an EDF will be described. The two sheets 11a and 11b are placed on a platform 40 of the fiber arranging apparatus at positions adjacent to each other with the adhesive layers 12*a* and 12*b* facing upward.

On the platform 40 of the fiber arranging apparatus, a gantry movable member 52 is mounted movably in the Y direction. More specifically, the movable member 52 is essentially composed of a horizontal part 52*b* and two vertical parts 52*a*, 52*a* formed at both ends of the horizontal part 52*b*. The two vertical parts 52*a*, 52*a* of the movable member 52 are slidable on the platform 40 to reciprocate in the Y direction. The horizontal part 52*b* is provided with a head support member 53 for reciprocating in the X direction. The head support member 53 supports a feed head 41. With the construction described above, the feed head 41 can freely move in the X and Y directions over the plane of the sheets 11*a* and 11*b* placed on the top surface of the platform 40.

Figure 4:
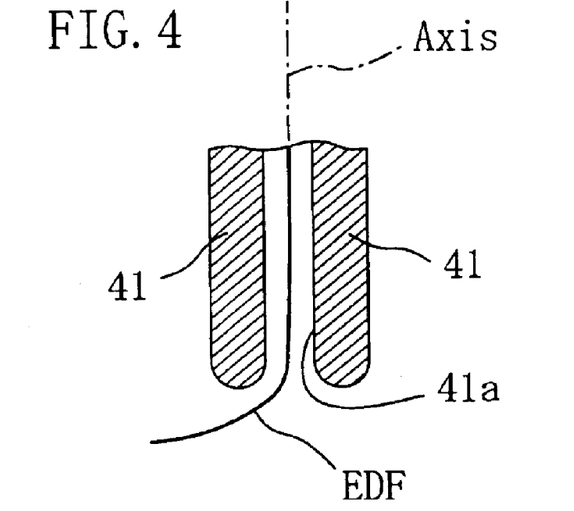
FIG. 4 is a diagrammatic view of a lower part of a feed head 41 in cross section.

FIG. 4 is a diagrammatic view of the lower part of the feed head 41 in cross section. The feed head 41 is in a cylindrical shape and has a through hole 41*a* extending vertically in the center. An EDF wound around a small bobbin 45 is released from the small bobbin 45 and passes through the through hole 41*a*. In this way, the EDF is fed to the surfaces of the sheets 11*a* and 11*b* via the feed head 41 and arranged. Accordingly, this fiber arranging apparatus can arrange the EDF at desired positions on the sheets 11*a* and 11*b*, and also can control the length of the EDF to be arranged. The sheets 11*a* and 11*b* may be placed removably at predetermined positions on the top surface of the platform 40.

The small bobbin 45 around which the EDF is wound is positioned above the feed head 41 so that the axis of the small bobbin 45 is roughly horizontal. The ends of the axis of the small bobbin 45 are supported by branched bottom portions (horizontally bent portions) of a vertically extending rotation axis 55. The small bobbin 45 rotates about the axis thereof with a feeding mechanism (not shown) to enable the EDF wound around the small bobbin 45 to be fed to the surfaces of the sheets 11*a* and 11*b*. The top portion of the rotation axis 55 is coupled to a rotating mechanism (not shown) to enable the rotation axis 55 to rotate about the axis of the top portion of the rotation axis 55. With the rotation of the top portion of the rotation axis 55 about the axis thereof, the EDF before being arranged rotates about the axis thereof.

The EDF is not rotated with the rotating mechanism when linear parts of the fiber-arrangement layers 13*a* and 13*b* are formed, and rotated when arc parts of the fiber-arrangement layer 13*a* and 13*b* are formed. The direction of the rotation of the EDF is the opposite to the direction in which the EDF is twisted about the axis thereof when the arc parts of the fiber-arrangement layers 13*a* and 13*b* are formed. Specifically, when the feed head 41 shifts leftward with respect to the twelve o'clock direction to form the arc parts of the fiber-arrangement layers 13*a* and 13*b*, the EDF is rotated about the axis thereof clockwise as is viewed from top. In reverse, when the feed head 41 shifts rightward with respect to the twelve o'clock direction to form the arc parts of the fiber-arrangement layers 13*a* and 13*b*, the EDF is rotated about the axis thereof counterclockwise as is viewed from top.

Therefore, during the arrangement of the EDF in an arc shape on the sheets 11*a* and 11*b* with movement of the feed head 41, the EDF before being arranged can be rotated about the axis thereof in the direction opposite to the direction in which the EDF will be twisted about the axis thereof. By this prior rotation of the EDF, it is possible to suppress generation of a twist on the EDF arranged on the sheets 11*a* and 11*b*.

In this embodiment, one long EDF is arranged in a shape of oval tracks displaced from one another in the plane by the thickness of the EDF. That is, the fiber arranging apparatus arranges the EDF to run from outside toward inside so that the EDF is displaced in the plane by the thickness of the EDF for each turn. Once the innermost track is formed, the EDF makes an S-shaped return to be arranged this time from inside toward outside forming oval tracks. In FIG. 2, only a small number of turns are shown for easy understanding. Actually, since a long EDF is handled, a far larger number of turns are formed than that in the illustrated case.

Once the arrangement of the EDF on one of the sheets 11*a* and 11*b* (for example, the sheet 11*a*) is completed forming the fiber-arrangement layer 13*a*, the EDF is sent to the other sheet 11*b*. The EDF is then arranged on the sheet 11*b* in substantially the same pattern as that of the fiber-arrangement layer 13*a* on the sheet Ha (that is, the shape of oval tracks). When the EDF is sent from the sheet 11*a* to the other sheet 11*b*, the portion of the EDF extending between the sheets 11*a* and 11*b*, denoted by 13*d*, is twisted a half turn about the axis thereof. The direction of this half-turn is appropriately determined so that the twist of the EDF portion 13*d* is cancelled when the sheets 11*a* and 11*b* are put one upon the other. In this embodiment, the EDF portion 13*d* is twisted a half turn in direction T shown in FIG. 2. By this twist, substantially no twist is generated on the EDF portion 13*d* when the sheet 11*a* is put upon the sheet 11*b*.

In this embodiment, if the EDF portion 13*d* is twisted by use of the fiber arranging apparatus, the EDF portion 13*d* may be rotated a half turn about the axis thereof clockwise as is viewed from top. In this embodiment, the sheets 11*a* and 11*b* are placed in contact with each other. Alternatively, the sheets 11*a* and 11*b* may be placed apart from each other. However, if the sheets 11*a* and 11*b* are unnecessarily apart from each other, the EDF portion 13*d* must be long excessively and thus may possibly be buckled when the sheets 11*a* and 11*b* are put one upon the other.

Once the arrangement of the EDF on the other sheet 11*b* is completed forming the fiber-arrangement layer 13*b*, the sheet 11*a* is reversed in direction R with respect to a virtual axis between the sheets 11*a* and 11*b*, so that the sheets 11*a* and 11*b* are put one upon the other with the adhesive layers 12*a* and 12*b* being located inside. The EDF portion 13*d* has been applied with a half-turn twist about the axis thereof during the arrangement. When the sheets 11*a* and 11*b* are put one upon the other, a twist in the direction opposite to the direction of the applied twist is generated on the EDF portion 13*d*. With the twist generated this time, the twist previously applied to the EDF portion 13*d* is cancelled.

The fiber-arrangement layer 13*a* on the sheet 11*a* adheres to the adhesive layer 12*a*. Therefore, the arrangement of the fiber-arrangement layer 13*a* is not easily deformed when the sheet 11*a* is reversed. In addition, since the fiber-arrangement layers 13*a* and 13*b* have substantially the same pattern, the fiber-arrangement layers 13*a* and 13*b* are not easily buckled when they are put one upon the other. By putting the sheets 11*a* and 11*b* one upon the other as described above, formed is a double-layer structure composed of the fiber-arrangement layers 13*a* and 13*b* continuing to each other via the continuation portion (EDF portion 13*d*). In other words, the fiber arrangement 13 having a double-layer fiber-wired structure composed of a continuous fiber is formed. In this embodiment, the EDF portion 13*d* is outside the fiber-arrangement layers 13*a* and 13*b*. Although the arrangement patterns of the two fiber-arrangement layers 13*a* and 13*b* are substantially the same in this embodiment, they may be different from each other.

Figure 5:
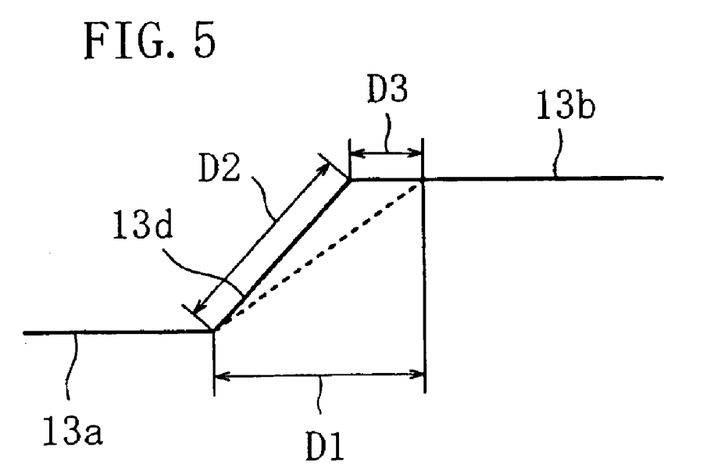
FIG. 5 is a partial enlarged plan view of an area of an EDF portion 13d and its surroundings for illustration of a displacement between fiber-arrangement layers 13a and 13b.

In this embodiment, the sheets 11a and 11b are placed so that the position of the fiber-arrangement layer 13a on the sheet 11a is slightly displaced from the position of the fiber-arrangement layer 13b on the sheet 11b. FIG. 5 is an enlarged plan view of an area of the EDF portion 13d and its surroundings for illustration of the displacement between the fiber-arrangement layers 13a and 13b. The dashed line in FIG. 5 shows a virtual position of the EDF portion 13d presumed if the EDF is arranged on the sheets 11a and 11b of which the ends are aligned with each other, that is, of which the ends in the Y direction are flush with each other. When the sheet 11a is put upon the other sheet 11b to align the arrangement patterns of the fiber-arrangement layers 13a and 13b with each other, the distance between the end of the fiber-arrangement layer 13a and the end of the fiber-arrangement layer 13b is D1 in FIG. 5. The length of the EDF portion 13d presumed if the EDF is arranged on the sheets 11a and 11b of which the ends are flush with each other is larger than D1. This may possibly cause buckling of the EDF portion 13d when the sheets 11a and 11b are put one upon the other.

The possibility of causing buckling of the EDF portion 13d when the sheets 11a and 11b are put one upon the other is reduced by displacing the sheet 11b with respect to the sheet 11a by D3 so that the length D2 of the EDF portion 13d is roughly equal to D1.

Once the sheets 11a and 11b are put one upon the other, the sheets 11a and 11b are bonded together with the fiber arrangement 13 of the double-layer structure interposed therebetween. This bonding may be made by utilizing a difference in atmospheric pressure or by using rollers, for example. In particular, utilizing a difference in atmospheric pressure is preferred because this will less damage the EDF.

To prevent buckling of the fiber-arrangement layers 13a and 13b, a buffering material such as porous polyethylene and silicone rubber may be interposed between the fiber-arrangement layers 13a and 13b. A buffering material resistant to slide is preferred. As required, an adhesive layer may be interposed between the fiber-arrangement layers 13a and 13b, to further ensure prevention of buckling of the fiber-arrangement layers 13a and 13b.

Embodiment 2

Figure 6:
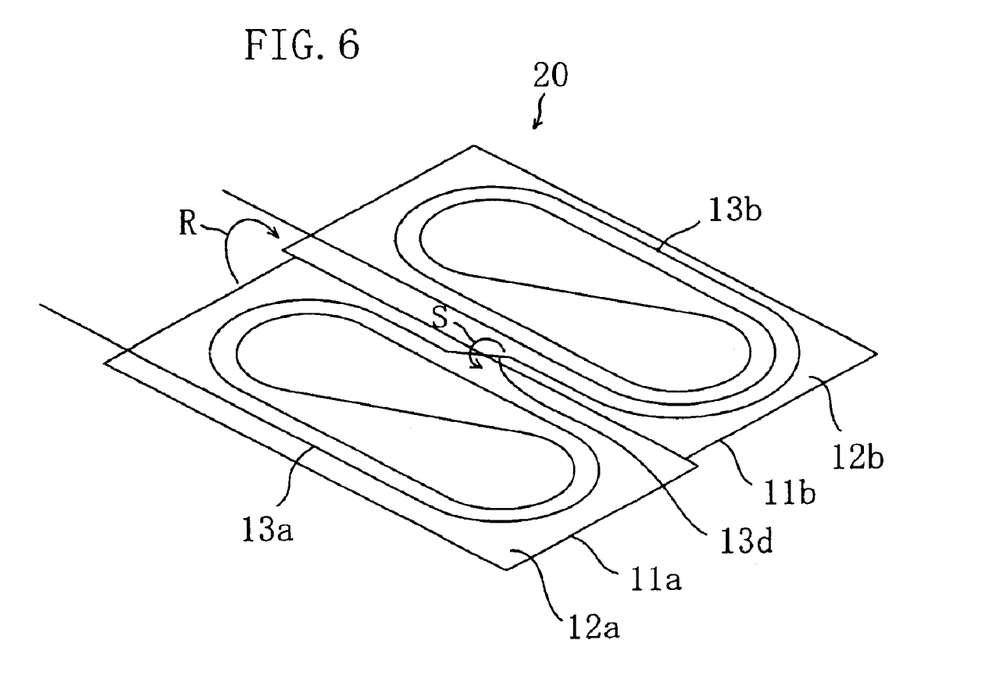
FIG. 6 is a perspective view diagrammatically illustrating a manufacturing process of an EDF sheet 20 of Embodiment 2.

FIG. 6 is a perspective view diagrammatically illustrating a manufacturing process of an EDF sheet 20 of Embodiment 2 of the present invention. Identical or similar components to those in Embodiment 1 are denoted by the same reference numerals, and the description thereof is omitted here.

This embodiment is different from Embodiment 1 in that in this embodiment no twist is applied to the EDF portion 13d when the EDF is sent from the sheet 11a to the other sheet 11b. In Embodiment 1, a half-turn twist is applied to the EDF portion 13d when the EDF is sent from the sheet 11a to the other sheet 11b during the arrangement of the EDF. In this embodiment, however, the EDF is sent to the sheet 11b with no twist applied to the EDF portion 13d extending between the sheets 11a and 11b. In other words, the EDF is sent to the sheet 11b while being arranged as is done in the formation of the linear parts of the fiber-arrangement layers 13a and 13b. As a result, when the sheets 11a and 11b are put one upon the other in the manner described in Embodiment 1, a half-turn twist in direction S is generated on the EDF portion 13d. However, since this degree of twist will not cause deterioration in polarization characteristics, it can be regarded that substantially no twist is generated. In addition, since the twist generated is a half turn, occurrence of a problem such as rapture is prevented.

After the sheets 11a and 11b are put one upon the other, the sheets 11a and 11b are bonded together with the fiber arrangement 13 of the double-layer structure interposed therebetween, as in Embodiment 1.

Embodiment 3

In Embodiments 1 and 2, a twist is generated on the EDF portion 13d extending between the sheets 11a and 11b when the sheets 11a and 11b are put one upon the other. In Embodiment 3, the sheets 11a and 11b are put one upon the other without generation of a twist on the EDF portion 13d.

Figure 7:
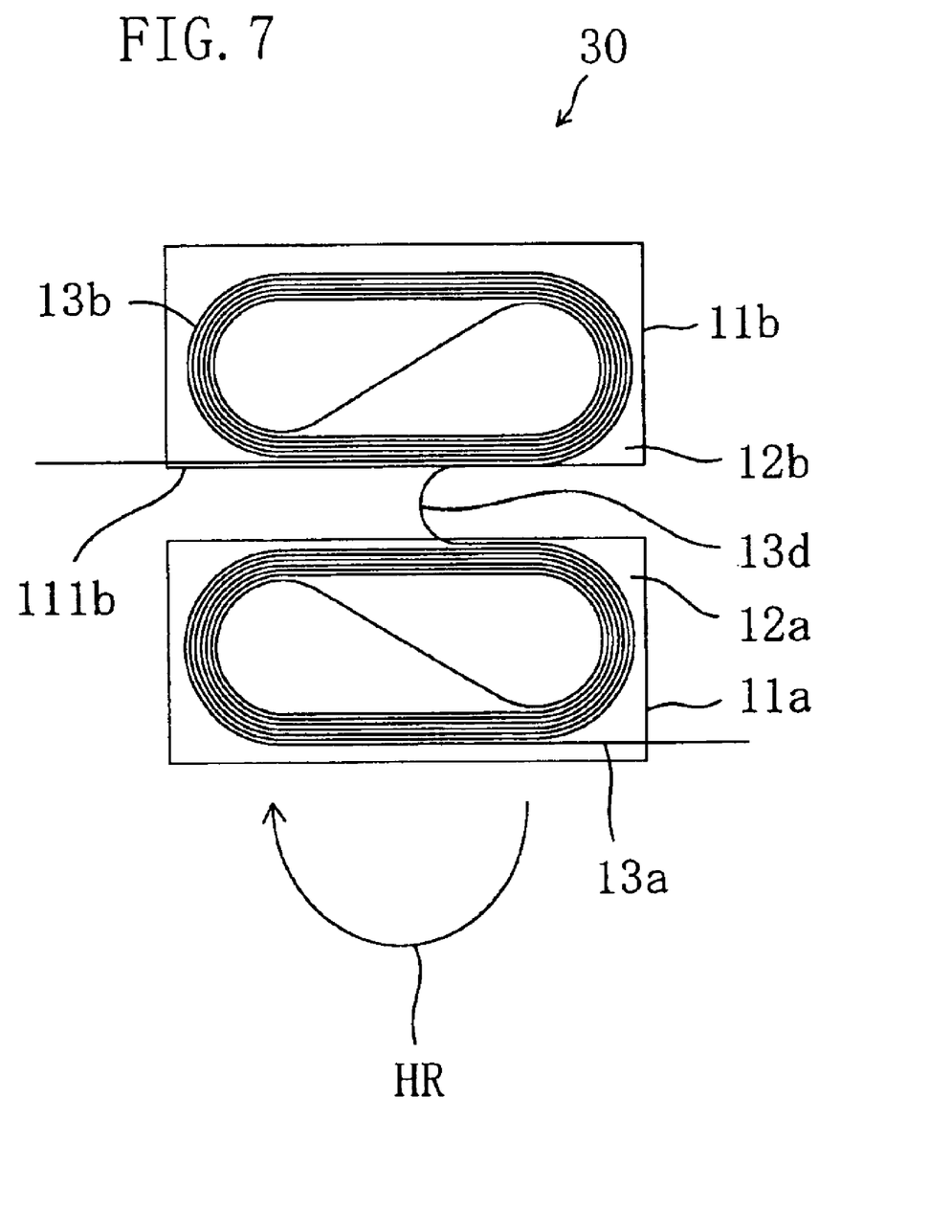
FIG. 7 is a perspective view diagrammatically illustrating a manufacturing process of an EDF sheet 30 of Embodiment 3.

FIG. 7 is a plan view diagrammatically illustrating a manufacturing process of an EDF sheet 30 of Embodiment 3. Identical or similar components to those in Embodiment 1 are denoted by the same reference numerals, and the description thereof is omitted here.

In the EDF sheet 30 shown in FIG. 7, when the EDF is sent from the sheet 11a to the other sheet 11b, the EDF portion 13d is arranged in an arc shape as is done in the formation of the arc parts of the fiber-arrangement layers 13a and 13b. No twist is therefore generated on the EDF portion 13d arranged in an arc shape.

In this embodiment, the fiber-arrangement layer 13b is formed on the sheet 11b at a position close to an edge 111b of the sheet 11b facing the adjacent sheet 11a.

Once the arrangement of the EDF on the other sheet 11b is completed forming the fiber-arrangement layer 13b, the sheet 11a is placed under the other sheet 11b (on the back side of the sheet of FIG. 7) while being rotated a half turn in clockwise direction HR as is viewed from top. That is, the fiber-arrangement layer 13a formed on the sheet 11a is placed in contact with the bottom surface of the sheet 11b. By this half-turn rotation, the arc-shaped EDF portion 13d becomes roughly linear. However, no twist is generated on the EDF portion 13d because no force acts about the axis of the EDF portion 13d.

Figure 8A:
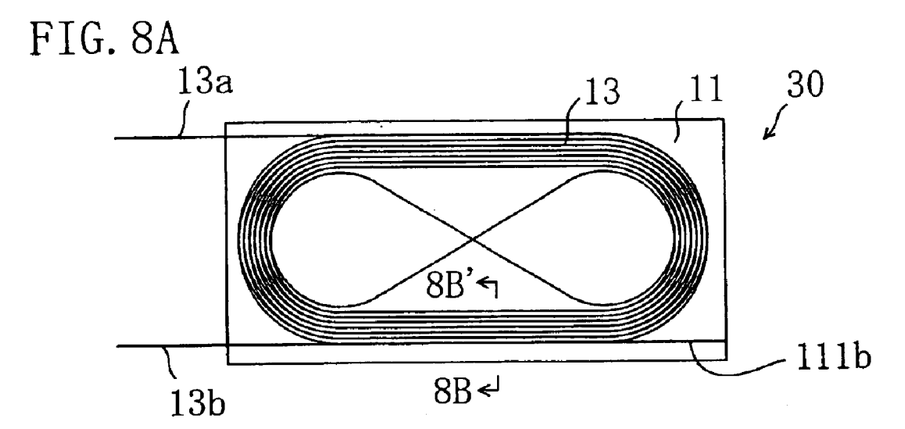
FIG. 8A is a diagrammatic plan view of the EDF sheet 30 of Embodiment 3.
Figure 8B:
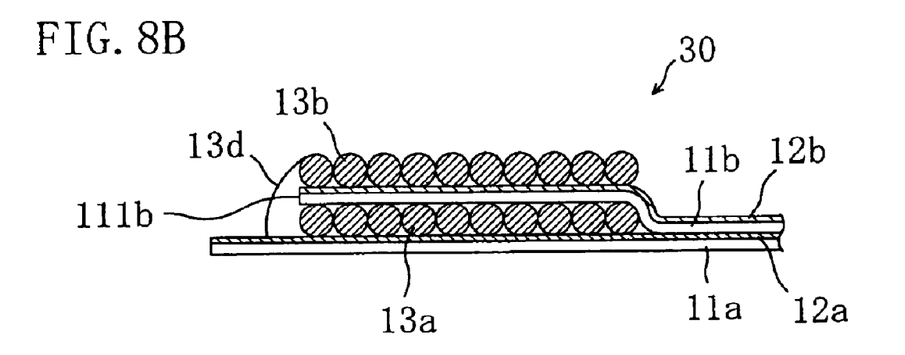
FIG. 8B is a cross-sectional view taken along line 8B–8B' of FIG. 8A.

FIG. 8A is a plan view diagrammatically illustrating the state of the sheets 11a and 11b put one upon the other in layers, and FIG. 8B is a cross-sectional view taken along line 8B–8B' in FIG. 8A. As shown in FIG. 8B, the fiber-arrangement layers 13a and 13b formed on the sheets 11a and 11b are layered with the sheet 11b interposed therebetween. In other words, the EDF sheet 30 shown in FIG. 7 includes the fiber arrangement of a multilayer structure composed of a continuous fiber.

After the sheets 11a and 11b are put one upon the other, the regions on the sheets 11a and 11b other than the fiber-arrangement layers 13a and 13b are bonded together as in Embodiment 1. The EDF portion 13d for allowing continuation of the fiber-arrangement layers 13a and 13b is located outside the fiber-arrangement layers 13a and 13b, or to be precise, outside the edge 111b of the sheet 11b.

Thus, by rotating the sheet 11a horizontally, not reversing, to place the sheet 11a under the sheet 11b in layers, the sheets 11a and 11b can be put one upon the other without generation of a twist to the EDF portion 13d.

Embodiment 4

In Embodiment 3, when the EDF portion 13d is arranged in an arc shape, the EDF before being arranged is rotated about the axis thereof so that no twist is generated.

In this embodiment, the EDF is sent to the other sheet 11b without rotation. That is, the EDF is sent while being arranged as is done in the formation of the linear parts of the fiber-arrangement layers 13a and 13b. Since the direction of arrangement is reversed at the EDF portion 13d in this embodiment, a half-turn twist is generated on the EDF portion 13d about the axis thereof. However, this degree of twist will not cause deterioration in polarization characteristics, and thus it can be regarded that substantially no twist is generated. In addition, since the twist is a half turn, occurrence of rapture and the like is prevented.

Embodiment 5

Figure 9:
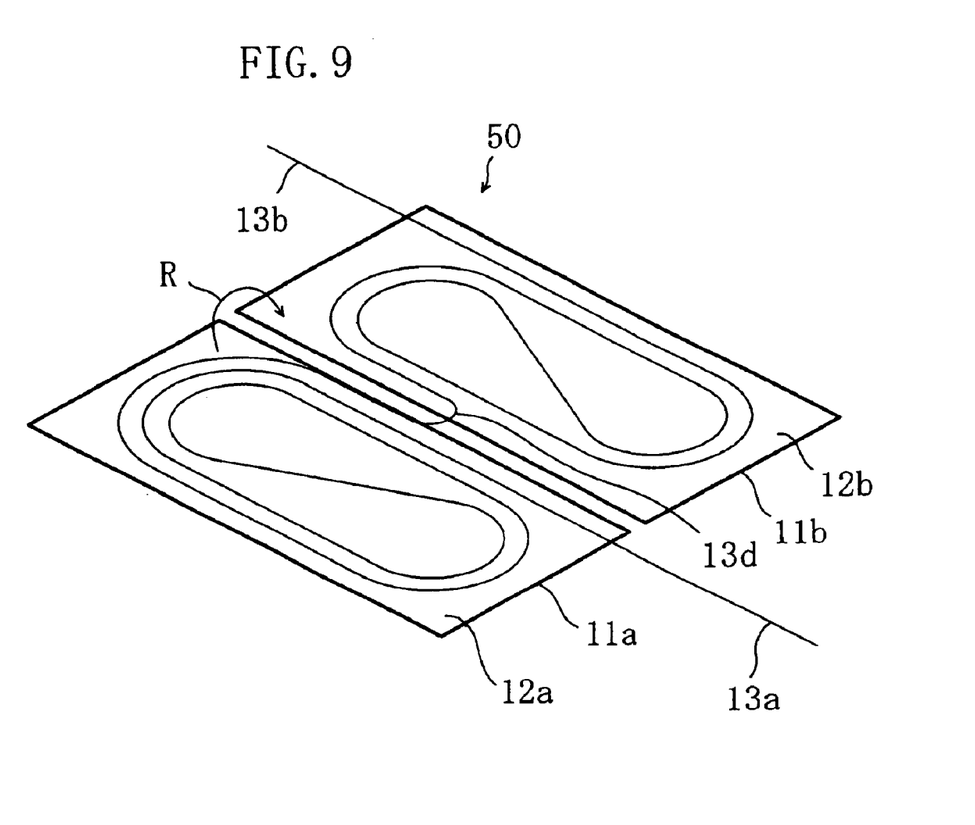
FIG. 9 is a perspective view diagrammatically illustrating a manufacturing process of an EDF sheet 50 of Embodiment 5.

FIG. 9 is a perspective view diagrammatically illustrating a manufacturing process of an EDF sheet 50 of Embodiment 5 of the present invention. Identical or similar components to those in Embodiment 1 are denoted by the same reference numerals, and the description thereof is omitted here.

This embodiment is the same as Embodiment 3 except that the sheet 11a is reversed in direction R with respect to a virtual axis between the sheets 11a and 11b to put the sheets 11a and 11b one upon the other. Therefore, although no twist is generated on the EDF portion 13d at the arrangement of the EDF portion 13d, a half-turn twist is generated on the EDF portion 13d when the sheets 11a and 11b are put one upon the other. However, this degree of twist will not cause deterioration in polarization characteristics, and thus it can be regarded that substantially no twist is generated. In addition, since the twist is a half turn, occurrence of rapture and the like is prevented. In this embodiment, the length of the EDF portion 13d is preferably as small as possible to prevent buckling of the EDF portion 13d.

Embodiment 6

Figure 10:
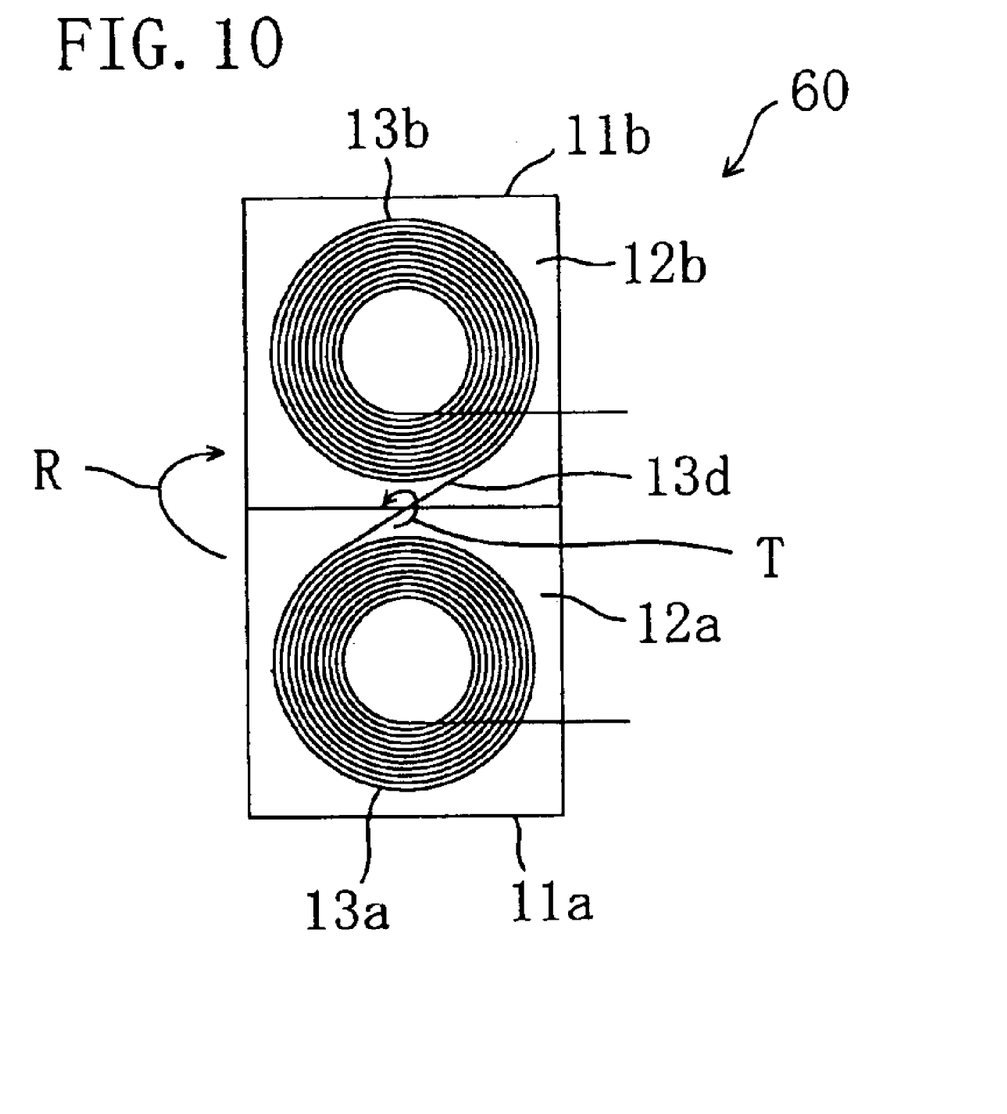
FIG. 10 is a perspective view diagrammatically illustrating a manufacturing process of an EDF sheet 60 of Embodiment 6.

In Embodiments 1 to 5, the fiber-arrangement layers 13a and 13b have roughly a shape of oval tracks as is viewed from top. The arrangement pattern of the fiber-arrangement layers 13a and 13b is not specifically limited. FIG. 10 is a plan view diagrammatically illustrating a manufacturing process of an EDF sheet 60 of Embodiment 6 of the present invention. Identical or similar components to those in Embodiment 1 are denoted by the same reference numerals, and the description thereof is omitted here.

The EDF sheet 60 shown in FIG. 10 is different from the EDF sheets of Embodiments 1 to 5 in that the fiber-arrangement layers 13a and 13b have roughly a circular shape as is viewed from top in this embodiment while they have roughly a shape of oval tracks in Embodiments 1 to 5. The EDF sheet 60 shown in FIG. 10 can be manufactured in the manner described in Embodiment 1. First, the EDF is arranged on the sheet 11a from inside (the side of the center of the circle) to outside clockwise as is viewed from top, to form the fiber-arrangement layer 13a. During this arrangement of the EDF on the sheet 11a in a circular shape, which is made using the fiber arranging apparatus described in Embodiment 1, the EDF before being arranged is rotated about the axis thereof counterclockwise as is viewed from top.

The EDF is then sent to the sheet 11b, and arranged on the sheet 11b from outside to inside (the side of center of the circle) counterclockwise as is viewed from top, to form the fiber-arrangement layer 13b. During the passing from the sheet 11a to the other sheet 11b, the EDF portion 13d extending between the sheets 11a and 11b is twisted a half turn about the axis thereof in direction T. When the sheet 11a is put upon the sheet 11b, a half-turn twist in the direction opposite to direction T is generated on the EDF portion 13d, and this cancels the twist of the EDF portion 13d applied during the fiber arrangement. During the arrangement of the EDF on the sheet 11b in a circular shape using the fiber arranging apparatus described in Embodiment 1, the EDF before being arranged is rotated about the axis thereof clockwise as is viewed from top.

The sheet 11a is reversed in direction R shown in FIG. 10 to be put upon the sheet 11b. The sheets 11a and 11b are then bonded together with the fiber arrangement 13 of the double-layer structure interposed therebetween. In this way, the EDF sheet 60 of this embodiment is completed.

Embodiment 7

Figure 11A:
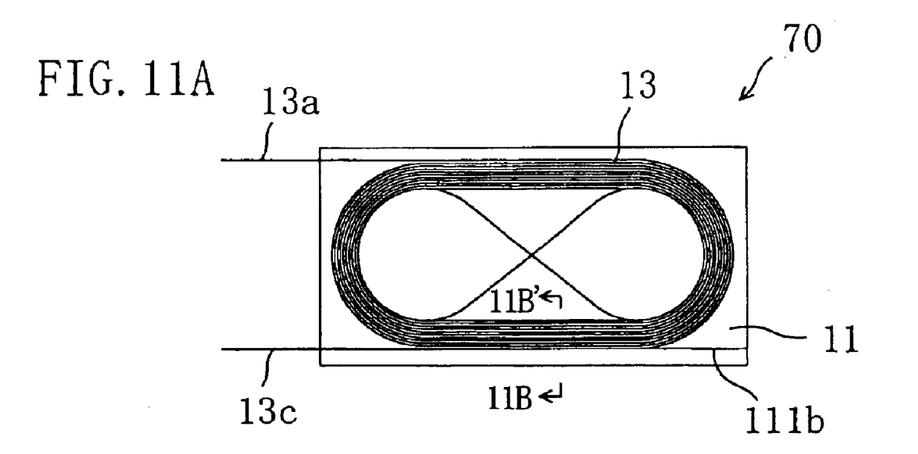
FIG. 11A is a diagrammatic plan view of an EDF sheet 70 of Embodiment 7.
Figure 11B:
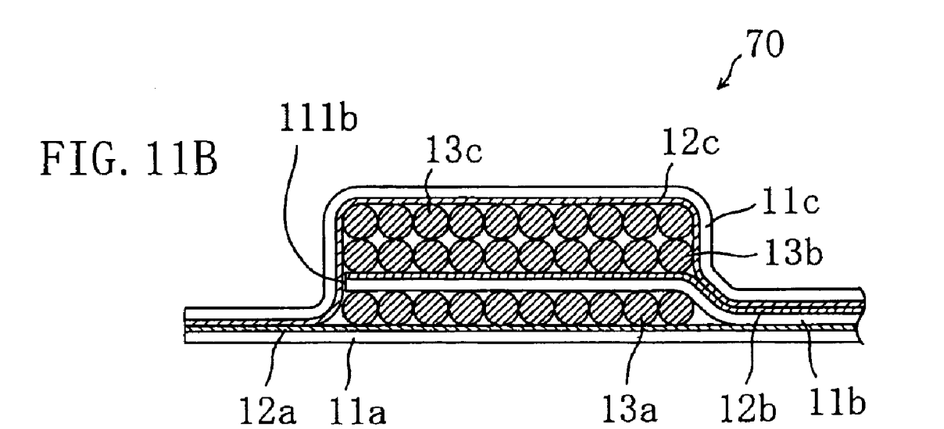
FIG. 11B is a cross-sectional view taken along line 11B–11B' of FIG. 11A.

In Embodiments 1 to 6, the fiber arrangement is of a double-layer structure. Alternatively, the fiber arrangement may have an arrangement structure of three or more layers. FIG. 11A is a diagrammatic plan view of an EDF sheet 70 of Embodiment 7, and FIG. 11B is a cross-sectional view taken along line 11B–11B' of FIG. 11A. Identical or similar components to those in Embodiment 1 are denoted by the same reference numerals, and the description thereof is omitted here.

The EDF sheet 70 includes three resin sheets 11a, 11b and 11c with respective adhesive layers 12a, 12b and 12c formed thereon. The EDF sheet 70 also includes fiber-arrangement layers 13b and 13c as a double-layer arrangement structure sandwiched by the sheets 11b and 11c, and a single-layer fiber-arrangement layer 13a formed in contact with the outer surface of the sheet 11b, to thereby constitute a fiber arrangement of a triple-layer structure as a whole. The fiber-arrangement layer 13a is covered with the sheet 11a via the adhesive layer 12a.

Figure 12:
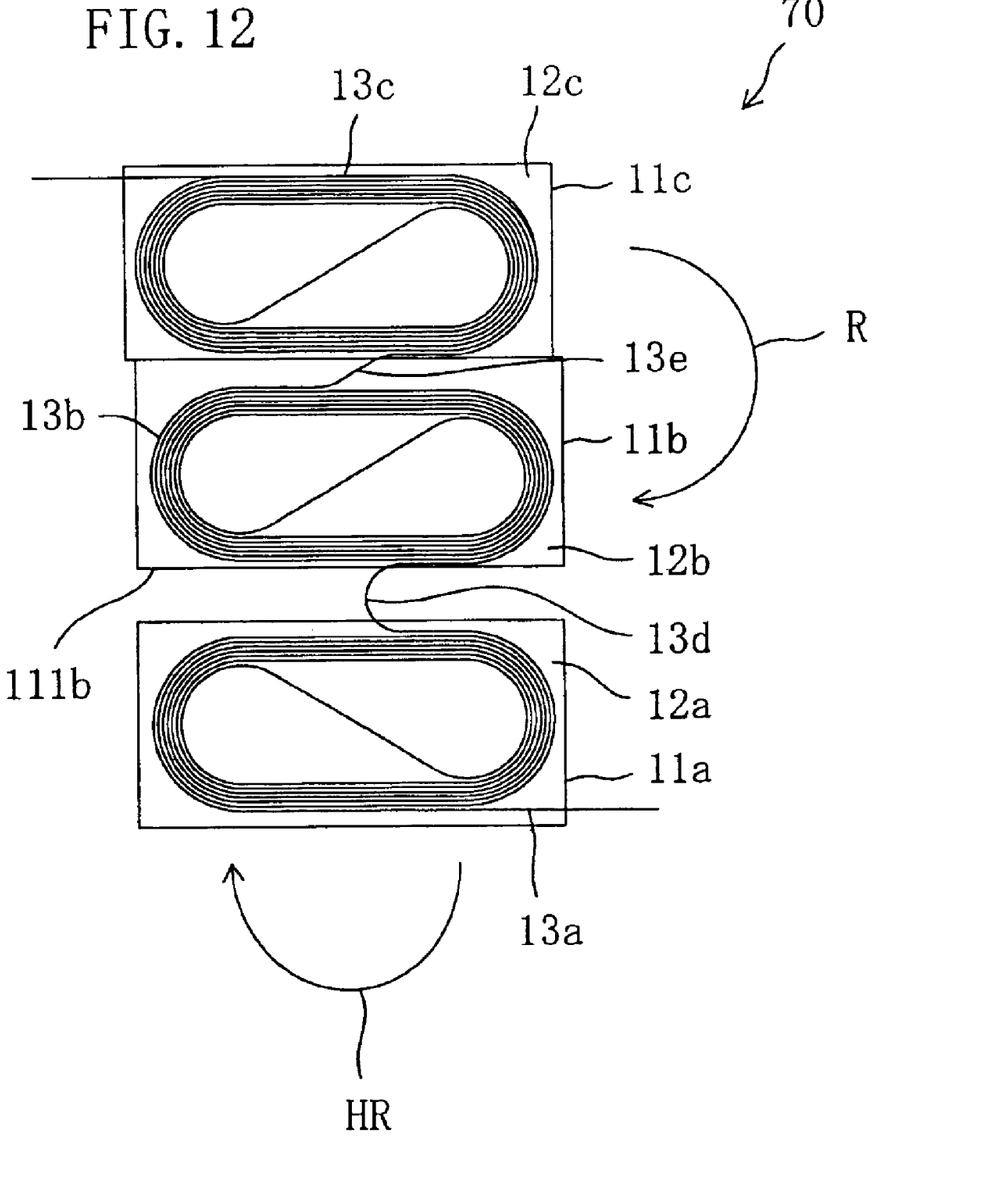
FIG. 12 is a perspective view diagrammatically illustrating a manufacturing process of the EDF sheet 70 of Embodiment 7.

FIG. 12 is a perspective view diagrammatically illustrating a manufacturing process of the EDF sheet 70 of this embodiment. Referring to FIG. 12, the manufacturing process of the EDF sheet 70 will be described.

In Embodiments 1 to 6, the EDF can be arranged in an arc shape without generating a twist on the EDF by use of a fiber arranging apparatus (for example, the fiber arranging apparatus shown in FIG. 3) that can rotate the EDF about the axis thereof. In this embodiment, the EDF is rotated about a virtual axis parallel with the axis of the EDF, to arrange the EDF in an arc shape with no twist generated on the EDF. The fiber arranging apparatus used in this embodiment is constructed so that the feed head 41 can freely move in the X and Y directions over the plane of the sheets mounted on the top surface of the platform, as in the case of the fiber arranging apparatus shown in FIG. 3.

Figure 13:
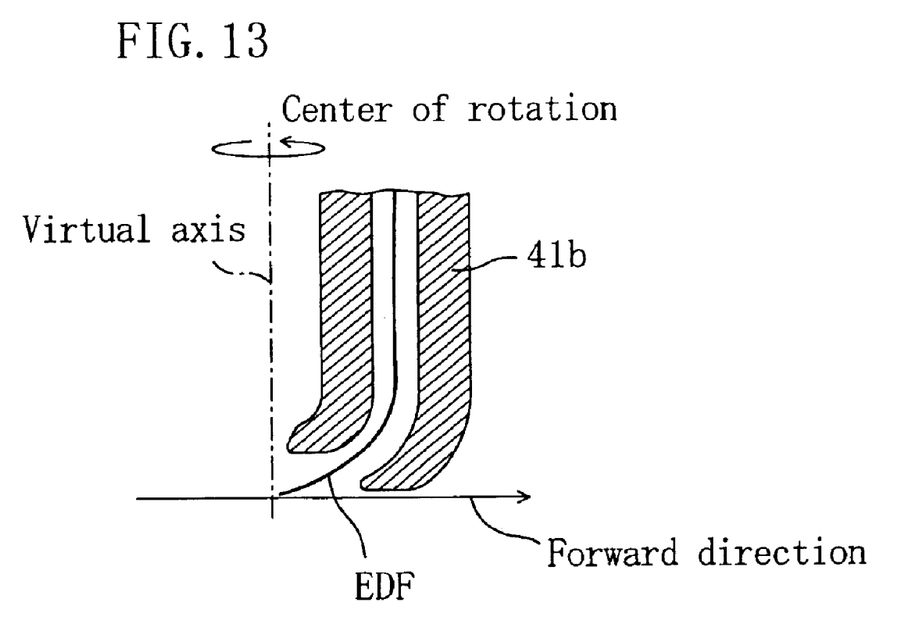
FIG. 13 is a diagrammatic view of a lower part of a feed head 41 used in Embodiment 7 in cross section.

FIG. 13 is a diagrammatic view of the lower part of the feed head 41 used in this embodiment in cross section. The tip of the outlet of the feed head 41 is curved toward the virtual axis like a beak. With this beaky tip, the EDF wound around a small bobbin (not shown) is guided toward the virtual axis from the outlet of the feed head 41 when the EDF is fed onto the sheets 11a, 11b and 11c. Due to this shape of the feed head 41, the EDF must be fed from the feed head 41 oriented in the forward direction of the arrangement, to avoid breakage of the EDF during the arrangement. Therefore, the platform or the feed head 41 of the fiber arranging apparatus is turned so that a front part 41b of the feed head 41 faces forward during formation of the linear parts of the fiber-arrangement layers 13a, 13b and 13c.

The fiber arranging apparatus used in this embodiment is provided with a rotating mechanism for rotating the feed head 41. With the rotating mechanism, the EDF can be rotated about the virtual axis extending vertically in parallel with the axis of the EDF.

The rotation of the feed head 41 with the rotating mechanism is not used when the linear parts of the fiber-arrangement layers 13a, 13b and 13c are formed, but is used when the arc parts thereof are formed. The rotation of the feed head 41 is controlled so that the front part 41b faces forward in the direction of arrangement. For example, for arrangement in an arc shape clockwise as is viewed from top, the EDF is arranged with the feed head 41 being rotated clockwise about the virtual axis. In reverse, for arrangement in an arc shape counterclockwise as is viewed from top, the EDF is arranged with the feed head 41 being rotated counterclockwise about the virtual axis. By this rotation, the EDF fed from the feed head 41 can always be arranged in the forward direction even when it is arranged in an arc shape. No twist is therefore generated on the arranged EDF.

After the first fiber-arrangement layer 13a is formed on the first sheet 11a, the EDF is sent to the second sheet 11b in an arc shape. The EDF is arranged on the second sheet 11b in a shape of oval tracks to form the second fiber-arrangement layer 13b. The EDF portion 13d in an arc shape is formed as is done in the formation of the arc part of the fiber-arrangement layer 13b.

After the formation of the second fiber-arrangement layer 13b on the second sheet 11b, the EDF is sent linearly to the third sheet 11c. The EDF is arranged on the third sheet 11c in a shape of oval tracks to form the third fiber-arrangement layer 13c. The linear EDF portion extending between the second and third sheets 11b and 11c, denoted by 13e, is formed as is done in the formation of the linear part of the fiber-arrangement layer.

The first sheet 11a and the adjacent second sheet 11b are put one upon the other. In this embodiment, the first sheet 11a is placed under the second sheet 11b (on the back side of the sheet of FIG. 12) while being rotated a half turn in clockwise direction HR as is viewed from top. That is, the first fiber-arrangement layer 13a formed on the first sheet 11a is placed in contact with the bottom surface of the second sheet 11b. By this half-turn rotation, the arc-shaped EDF portion 13d becomes roughly linear. However, no twist is generated in the EDF portion 13d because no force acts about the axis of the EDF portion 13d.

After the stacking of the first and second sheets 11a and 11b, the adjacent third sheet 11c is reversed in direction R, and thus the second and third sheets 11b and 11c are put one upon the other so that the second and third fiber-arrangement layers 13b and 13c come into contact with each other. At this time, a half-turn twist is generated on the EDF portion 13e about the axis thereof. However, this degree of twist will not cause deterioration in polarization characteristics, and thus it can be regarded that substantially no twist is generated. In addition, since the twist is a half turn, occurrence of rapture and the like is prevented.

By the process described above, the fiber-wired sheet of a triple-layer structure composed of a continuous fiber is attained. Note that although the EDF portion 13d for continuation of the first and second fiber-arrangement layers 13a and 13b actually exists outside the edge 111b of the second sheet 11b, this is omitted in FIG. 11B for simplification In this embodiment, the first and second sheets 11a and 11b are first put together and then the third sheet 11c is placed on the first and second sheets 11a and 11b. Alternatively, the second and third sheets 11b and 11c may be first put together and then the first sheet 11a may be placed under the second and third sheets 11b and 11c.

In this embodiment, the triple-layer arrangement structure was described. The fiber arrangement of a structure of four or more layers can also be manufactured in a manner similar to that described above.

Other Embodiments

The fiber-wired sheet of the present invention can be manufactured using a fiber arranging apparatus other than the fiber arranging apparatus described in Embodiments 1 and 7. For example, usable is a fiber arranging apparatus with a fixed feed head and a platform freely movable in the X and Y directions. The means for substantially preventing generation of a twist on the EDF portion for continuation of the fiber-arrangement layers is not limited to those described in Embodiments 1 to 7 above, but can be appropriately set in consideration of the arrangement pattern of the fiber-arrangement layers and the direction of reversal or rotation of the sheet.

In Embodiments 1 to 7, a plurality of sheets are put one upon another. Alternatively, one sheet may be cut into a plurality of pieces after an EDF is arranged on the sheet. Otherwise, one sheet may be bent and folded without cutting.

The fiber-wired sheet of the present invention is applicable, not only to continuous arrangement of one EDF (fiber), but also continuous arrangement of two or more EDFs (fibers). For example, two or more EDFs (fibers) may be arranged alongside each other like drawing parallel lines continuously.

According to the present invention, fiber arrangement is sandwiched by sheets and retained by adhesive layers formed on the sheets. Therefore, the fiber arrangement is prevented from buckling. Since no adhesive layer is necessary between the layers of the fiber arrangement, the manufacturing process is simplified. The fiber-wired sheet can be manufactured only by bonding a plurality of sheets together. This improves the manufacturing efficiency compared with the conventional method.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A fiber-wired sheet including a fiber arrangement having a multilayer structure composed of a continuous fiber and a sheet interposed between adjacent layers of the fiber arrangement, the sheet having an adhesive layer.

2. The fiber-wired sheet of claim 1, wherein the fiber arrangement has a plurality of fiber-arrangement layers and at least one continuation portion for enabling continuation between the plurality of fiber-arrangement layers, and the at least one continuation portion is formed outside the plurality fiber-arrangement layers.

3. The fiber-wired sheet of claim 1, wherein the fiber arrangement has a plurality of fiber-arrangement layers and at least one continuation portion for enabling continuation between the plurality of fiber-arrangement layers, and substantially no twist is generated on the at least one continuation portion.

4. The fiber-wired sheet of claim 1, wherein the layers of the fiber arrangement have roughly the same arrangement pattern.

5. The fiber-wired sheet of claim 1, wherein the fiber arrangement is sandwiched by a pair of sheets having respective adhesive layers on the surfaces facing the fiber arrangement.

6. A method for manufacturing a fiber-wired sheet comprising the steps of:
    arranging a fiber continuously on a plurality of sheets having respective adhesive layers, to form single-layer fiber-arrangement layers on the plurality of sheets; and
    putting two adjacent sheets among the plurality of sheets one upon the other after the arrangement of the fiber.

7. The method of claim 6, wherein the step of putting two adjacent sheets includes the step of reversing one of the two sheets with respect to a virtual axis between the two sheets.

8. The method of claim 6, wherein the step of putting two adjacent sheets includes the step of rotating one of the two sheets a half turn as is viewed from top.

* * * * *